US012575426B2

(12) United States Patent
Nakagawa et al.

(10) Patent No.: US 12,575,426 B2
(45) Date of Patent: Mar. 10, 2026

(54) WAFER-SCALE CHIP STRUCTURE AND METHOD AND SYSTEM FOR DESIGNING THE STRUCTURE

(71) Applicant: GlobalFoundries U.S. Inc., Malta, NY (US)

(72) Inventors: Osamu Samuel Nakagawa, Redwood City, CA (US); Ushasree Katakamsetty, Singapore (SG); Howard S. Landis, Essex Junction, VT (US); Stefan Nikolaev Voykov, Sofia (BG)

(73) Assignee: GlobalFoundries U.S. Inc., Malta, NY (US)

( * ) Notice: Subject to any disclaimer, the term of this patent is extended or adjusted under 35 U.S.C. 154(b) by 707 days.

(21) Appl. No.: 17/935,588

(22) Filed: Sep. 27, 2022

(65) Prior Publication Data

US 2024/0105633 A1 Mar. 28, 2024

(51) Int. Cl.
*H01L 23/544* (2006.01)
*G06F 30/392* (2020.01)
(Continued)

(52) U.S. Cl.
CPC .......... *H01L 23/544* (2013.01); *G06F 30/392* (2020.01); *G06F 30/398* (2020.01);
(Continued)

(58) Field of Classification Search
CPC ............. G06F 2111/16; G06F 2117/12; H01L 23/544; H01L 2223/5442;
(Continued)

(56) References Cited

U.S. PATENT DOCUMENTS 6,693,357 B1 * 2/2004 Borst ................ H01L 21/31053
257/E21.244
7,888,800 B2 2/2011 Landis
(Continued)

FOREIGN PATENT DOCUMENTS

DE 102019006294 B3 * 11/2020 ............. H10D 84/90
EP 3190464 A1 * 7/2017 ......... G03F 7/70616
(Continued)

OTHER PUBLICATIONS

Kwon et al., Korean Patent Document No. KR-1544319-B1, published Aug. 12, 2015, 3 pages including abstract and claim. (Year: 2015).*

(Continued)

*Primary Examiner* — Phallaka Kik
(74) *Attorney, Agent, or Firm* — Francois Pagette; Hoffman Warnick LLC

(57) ABSTRACT

Disclosed is a wafer-scale chip structure including a semiconductor wafer and multiple dies on the semiconductor wafer. The dies can include at least two dies with different patterns of fill shapes. Also disclosed are wafer-scale chip design methods and systems. In the design methods and systems, post-chip layout wafer-level topography optimization is performed to, for example, minimize performance variations between dies of the same design within the wafer-scale chip. Specifically, across-wafer die placement and wafer-level topography information is used to custom design and/or select different patterns of fill shapes to be inserted into the layouts of dies placed at different locations across the wafer-scale chip (including different patterns to be inserted into the layouts of dies that have the same design) in order to generate a design that minimizes either all across-wafer thickness variations or at least across-wafer (Continued)

thickness variations associated with specific dies having the same specific design.

10 Claims, 12 Drawing Sheets

(51) Int. Cl.
| | | |
|---|---|---|
| *G06F 30/398* | (2020.01) | |
| *G06F 111/16* | (2020.01) | |
| *G06F 117/12* | (2020.01) | |

(52) U.S. Cl.
CPC ....... *G06F 2111/16* (2020.01); *G06F 2117/12* (2020.01); *H01L 2223/5442* (2013.01); *H01L 2223/54433* (2013.01)

(58) Field of Classification Search
CPC ....... H01L 2223/54433; H01L 23/5442; H01L 23/54433
USPC ........... 716/132, 54, 55; 703/14; 326/41, 47, 326/101
See application file for complete search history.

(56) References Cited

U.S. PATENT DOCUMENTS

| | | | |
|---|---|---|---|
| 7,898,065 | B2 | 3/2011 | Anderson et al. |
| 8,839,177 | B1 | 9/2014 | Aubel et al. |
| 9,620,493 | B2* | 4/2017 | Yang ........................ H01L 22/20 |
| 10,672,748 | B1* | 6/2020 | Parvarandeh ........... H01L 24/95 |
| 2007/0216891 | A1 | 9/2007 | Tsai et al. |
| 2007/0256039 | A1* | 11/2007 | White ..................... G06F 30/39 716/54 |
| 2007/0264798 | A1 | 11/2007 | Tseng et al. |
| 2007/0287200 | A1 | 12/2007 | Anderson et al. |
| 2008/0046852 | A1* | 2/2008 | Bergman Reuter .. G06F 30/392 716/132 |
| 2009/0162760 | A1 | 6/2009 | Hoshino et al. |
| 2009/0319973 | A1* | 12/2009 | Anderson ............... G06F 30/39 257/499 |
| 2010/0044873 | A1* | 2/2010 | Kameyama ............. H01L 24/32 438/114 |
| 2010/0140767 | A1* | 6/2010 | Wu ..................... H01L 25/0657 438/455 |
| 2011/0078647 | A1* | 3/2011 | Ju ........................... G06F 30/39 716/122 |
| 2011/0289470 | A1* | 11/2011 | Bickford ............... G06F 30/398 716/132 |
| 2013/0130424 | A1* | 5/2013 | Horton .................. B81B 7/0058 438/50 |
| 2013/0249088 | A1* | 9/2013 | Scanlan ................... H01L 23/52 438/618 |
| 2014/0021622 | A1* | 1/2014 | Bonilla ................. H01L 23/522 257/773 |
| 2014/0205934 | A1* | 7/2014 | Hisamura ................. G03F 1/00 430/312 |
| 2014/0339712 | A1* | 11/2014 | Alvarado ............ H01L 23/3114 257/786 |
| 2016/0005672 | A1* | 1/2016 | Dubey .................. H01L 21/563 257/778 |
| 2016/0379845 | A1* | 12/2016 | Oh .......................... H01L 24/19 438/126 |
| 2017/0373041 | A1* | 12/2017 | Kim ........................ H01L 24/20 |
| 2018/0198041 | A1* | 7/2018 | Peterson ............... H10H 20/01 |
| 2021/0074651 | A1* | 3/2021 | Gude ................. H01L 25/0655 |
| 2021/0407901 | A1* | 12/2021 | Akarvardar ............ H01L 21/78 |
| 2022/0336361 | A1* | 10/2022 | Yu ....................... H01L 25/0655 |
| 2023/0047504 | A1* | 2/2023 | Bartling ............ H10D 84/0149 |
| 2023/0140683 | A1* | 5/2023 | Chang ............... H01L 21/76898 257/774 |
| 2025/0308993 | A1* | 10/2025 | Bartling ........... H01L 23/53271 |

FOREIGN PATENT DOCUMENTS

| | | | | |
|---|---|---|---|---|
| JP | 2010219189 A | * | 9/2010 | |
| TW | 201430486 A | * | 8/2014 | ........... G03F 7/2022 |

OTHER PUBLICATIONS

Chen et al., "An Improved Rule-Based Dummy Metal Fill Method for 65 NM ASIC Design," Journal of Circuits, Systems, and Computers, vol. 22, No. 4 (2013), 15 pages.

Katakamsetty et al., "Wafer Level Analysis and Simulation of Back End of Line Chemical Mechanical Polishing Processes," SPIE 2022, 8 pages.

Groeneveld, "Wafer Scale Interconnect and Pathfinding for Machine Learning Hardware (Invited)," Abstract, SLIP 20: Proceedings of the Workshop on System-Level Interconnect: Problems and Pathfinding Workshop Nov. 2020, 1 page.

James et al., "ISPD 2020 Physical Mapping of Neural Networks on a Wafer-Scale Deep Learning Accelerator," ISPD 20 Sep. 20-23, 2020, Taipei, Taiwan, Proceedings published Mar. 29, 2020 5 pages.

* cited by examiner

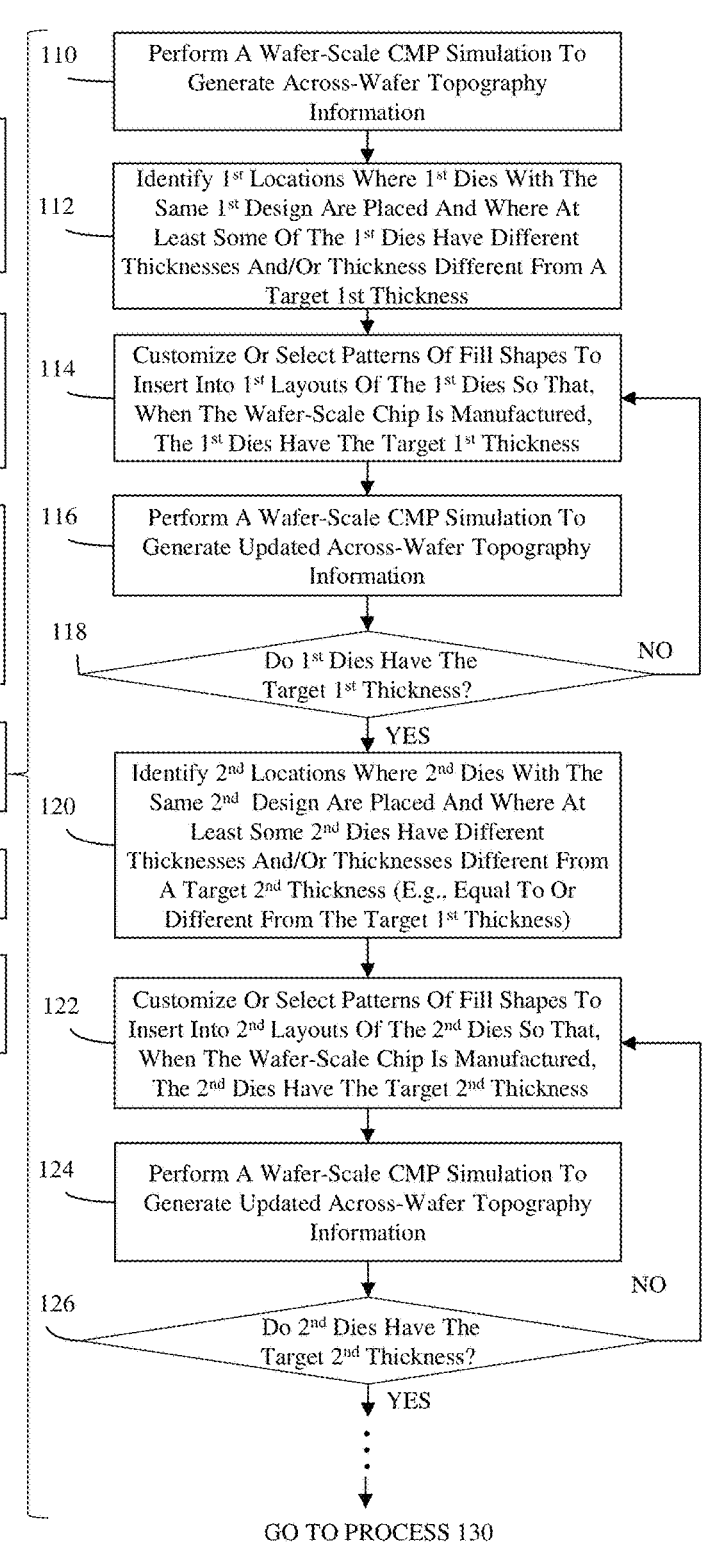

102   Generate An Initial Design For A Wafer-Scale Chip Including Custom Design And/Or Selection Of Dies To Be Included In The Wafer-Scale Chip 103   Perform Die-Level Physical Design Processes To Generate Layouts For The Custom Designed Or Selected Dies (without performing die-level topography control)

104   Perform Wafer-Level Physical Design Processes To Generate An Initial Layout For The Wafer-Scale Chip (Including Die Placement And Wafer-Level Wire Routing)

106   Perform Wafer-Level Topography Control

130   Generate Final Wafer-Scale Chip Design

140   Manufacture A Wafer-Scale Chip According To The Final Wafer-Scale Chip Design 110   Perform A Wafer-Scale CMP Simulation To Generate Across-Wafer Topography Information 112   Identify 1st Locations Where 1st Dies With The Same 1st Design Are Placed And Where At Least Some Of The 1st Dies Have Different Thicknesses And/Or Thickness Different From A Target 1st Thickness 114   Customize Or Select Patterns Of Fill Shapes To Insert Into 1st Layouts Of The 1st Dies So That, When The Wafer-Scale Chip Is Manufactured, The 1st Dies Have The Target 1st Thickness 116   Perform A Wafer-Scale CMP Simulation To Generate Updated Across-Wafer Topography Information 118   Do 1st Dies Have The Target 1st Thickness?    NO

YES

120   Identify 2nd Locations Where 2nd Dies With The Same 2nd Design Are Placed And Where At Least Some 2nd Dies Have Different Thicknesses And/Or Thicknesses Different From A Target 2nd Thickness (E.g., Equal To Or Different From The Target 1st Thickness)

122   Customize Or Select Patterns Of Fill Shapes To Insert Into 2nd Layouts Of The 2nd Dies So That, When The Wafer-Scale Chip Is Manufactured, The 2nd Dies Have The Target 2nd Thickness 124   Perform A Wafer-Scale CMP Simulation To Generate Updated Across-Wafer Topography Information 126   Do 2nd Dies Have The Target 2nd Thickness?    NO

YES

GO TO PROCESS 130

FIG. 1

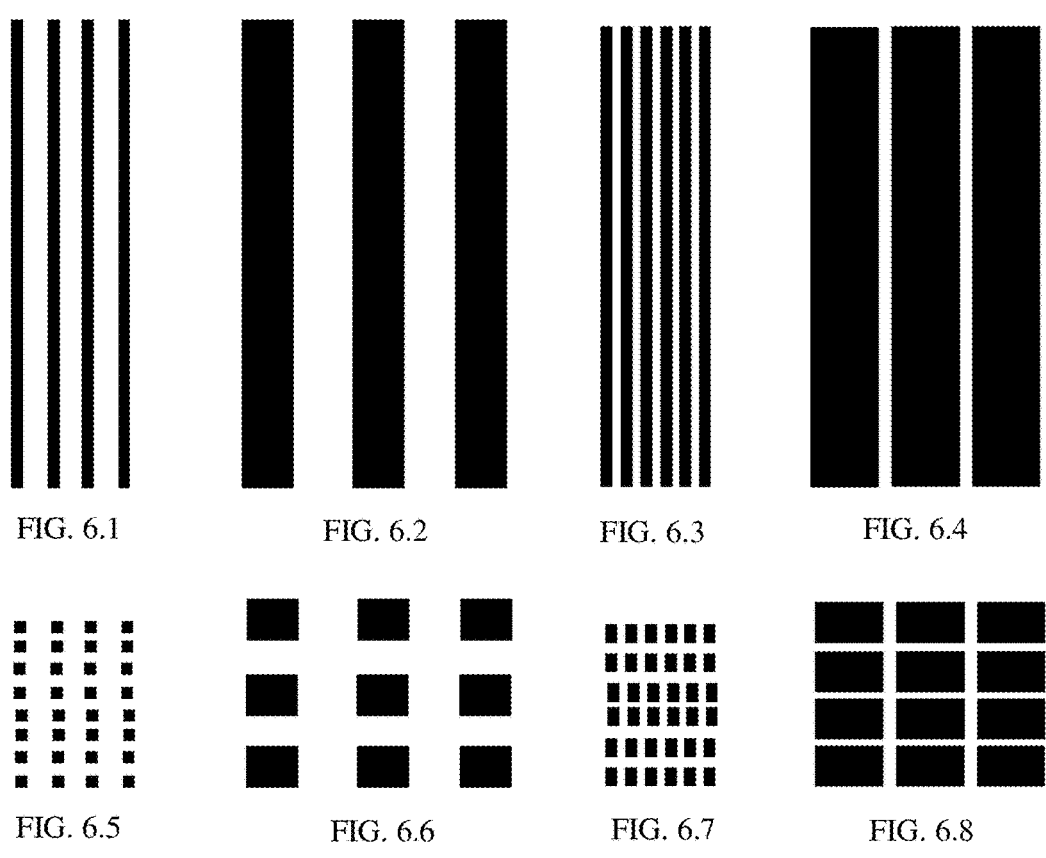
FIG. 6.1      FIG. 6.2      FIG. 6.3      FIG. 6.4
FIG. 6.5      FIG. 6.6      FIG. 6.7      FIG. 6.8
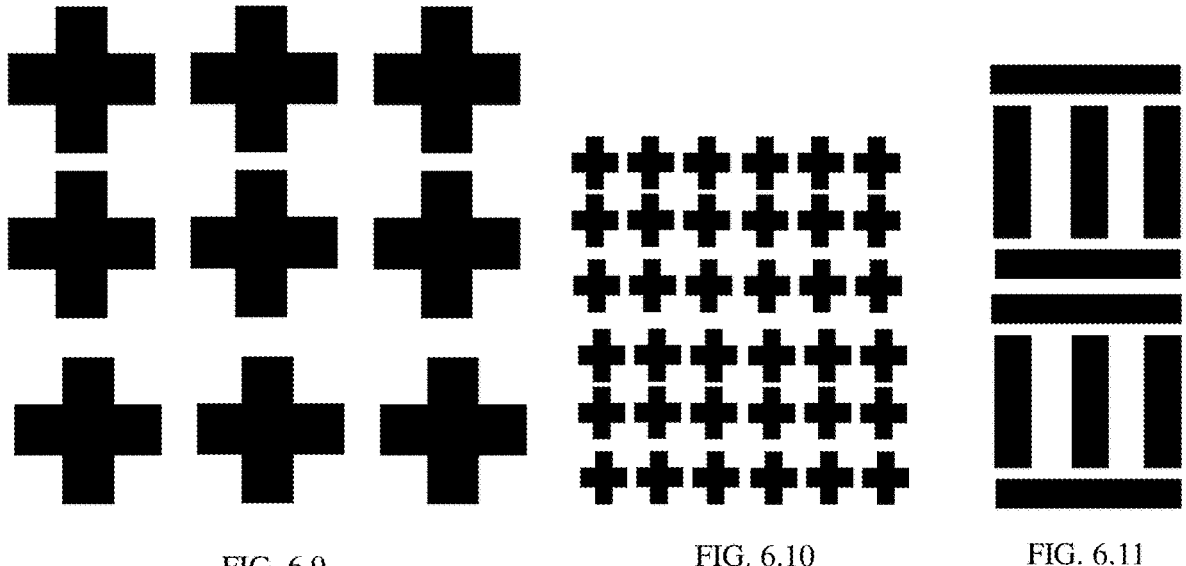
FIG. 6.9      FIG. 6.10      FIG. 6.11

WAFER-SCALE CHIP STRUCTURE AND METHOD AND SYSTEM FOR DESIGNING THE STRUCTURE

BACKGROUND

The present disclosure relates to wafer-scale chips and, more particularly, to embodiments of a wafer-scale chip structure and method and system embodiments for designing the structure.

A semiconductor wafer typically has a relatively large diameter such as a 200 mm diameter (e.g., 8-inch diameter), a 300 mm diameter (e.g., 12-inch diameter), a 450 mm diameter (e.g., an 18-inch diameter), etc. Typically, multiple chips having the same design and size, such as approximately 2.5 cm by 2.5 cm, are formed on a semiconductor wafer and separated by kerf lines. Following chip manufacturing, the semiconductor wafer is cut along the kerf lines (i.e., diced), thereby separating the chips. For applications requiring significant computing power, multiple chips can be mounted on a printed circuit board (PCB) or packaged in multi-chip module (MCM) and interconnected. Recently, wafer-scale chips have been developed to increase processing speed. In a wafer-scale chip, multiple dies are formed on a wafer. Some of the dies can have the same design and some can have different designs. The various dies on the semiconductor are interconnected (e.g., using back end of the line (BEOL) wiring), thereby avoiding the need for dicing the semiconductor wafer and improving processing speeds and, particularly, the processing speed associated with chip-to-chip communications. However, because dies with the same design may be formed in different locations across the wafer and because wafer topography in those different locations may be different, the dies may perform differently.

SUMMARY

Disclosed herein are embodiments of a wafer-scale chip structure. The wafer-scale chip structure can include a semiconductor wafer. The wafer-scale chip structure can further include multiple dies on the semiconductor wafer. The dies can include at least two dies with different patterns of fill shapes.

Disclosed herein are embodiments of a design method for a wafer-scale chip. The method can include accessing, by a processor from memory, across-wafer die placement information for a wafer-scale chip and across-wafer topography information for the wafer-scale chip. The across-wafer die placement information can indicate locations of dies on a semiconductor wafer. The across-wafer topography information can indicate different thicknesses of the wafer-scale chip at the same locations on the semiconductor wafer given placement of the dies. The method can also include, based on the across-wafer die placement information and on the across-wafer topography information, inserting different patterns of fill shapes into layouts for the dies (e.g., to minimize all across-wafer thickness variations or to at least minimize across-wafer thickness variations associated with specific dies having the same specific design). The method can further include generating, by the processor, a final wafer-scale chip design including the different patterns of fill shapes. Such a final wafer-scale chip design can be output for use in manufacturing the wafer-scale chip.

Also disclosed herein are embodiments of a design system for a wafer scale chip. The system can include a memory, which stores across-wafer die placement information for a wafer-scale chip and across-wafer topography information for the wafer-scale chip. The across-wafer die placement information can indicate locations of dies on a semiconductor wafer. The across-wafer topography information can indicate different thicknesses of the wafer-scale chip at the same locations on the semiconductor wafer given placement of the dies. The system can also include a processor in communication with the memory. The processor can access the across-wafer die placement information and the across-wafer topography information and, based on the across-wafer die placement information and the across-wafer topography information, can insert different patterns of fill shapes into layouts for the dies (e.g., to minimize all across-wafer thickness variations or to at least minimize across-wafer thickness variations associated with specific dies having the same specific design). The processor can further generate a final wafer-scale chip design including the different patterns of fill shapes. Such a final wafer-scale chip design can be output for use in manufacturing of the wafer-scale chip.

BRIEF DESCRIPTION OF THE SEVERAL VIEWS OF THE DRAWINGS

The present disclosure will be better understood from the following detailed description with reference to the drawings, which are not necessarily drawn to scale and in which:

FIG. 1 is a flow diagram illustrating embodiments of a disclosed method;

FIGS. 6.1-6.11 are layout diagrams illustrative of fill shape patterns;

DETAILED DESCRIPTION

As mentioned above, a semiconductor wafer typically has a relatively large diameter such as a 200 mm diameter (e.g., 8-inch diameter), a 300 mm diameter (e.g., 12-inch diameter), a 450 mm diameter (e.g., an 18-inch diameter), etc. Typically, multiple chips having the same design and size, such as approximately 2.5 cm by 2.5 cm, are formed on a semiconductor wafer and separated by kerf lines. Following chip manufacturing, the semiconductor wafer is cut along the kerf lines (i.e., diced), thereby separating the chips. For applications requiring significant computing power, multiple chips can be mounted on a printed circuit board (PCB) or packaged in multi-chip module (MCM) and interconnected. Recently, wafer-scale chips have been developed to increase processing speed. In a wafer-scale chip, multiple dies are formed on a wafer. Some of the dies can have the same design and some can have different designs. The various dies on the semiconductor are interconnected (e.g., using back end of the line (BEOL) wiring), thereby avoiding the need for dicing the semiconductor wafer and improving processing speeds and, particularly, the processing speed associated with chip-to-chip communications. However, because dies with the same design may be formed in different locations across the wafer and because wafer topography in those different locations may be different, the dies may perform differently.

In view of the foregoing, disclosed herein are embodiments of design methods and systems that generate a wafer-scale chip design and that, during generation of the wafer-scale chip design, perform post-chip layout wafer-level topography control (also referred to herein as wafer-level topography optimization) to minimize performance variations between dies of the same design within the wafer-scale chip. Specifically, in the disclosed design methods and systems, across-wafer topography control is performed using across-wafer die placement and wafer-level topography information to customize and/or select different patterns of fill shapes (also referred to herein as dummy fill shapes or non-functional fill shapes) to be inserted into the layouts of dies placed at different locations across the wafer-scale chip (including different patterns to be inserted into the layouts of dies that have the same design) in order to adjust the wafer topography and, particularly, to minimize either all across-wafer thickness variations or at least across-wafer thickness variations associated with specific dies having the same specific design. Also disclosed herein are embodiments of a wafer-scale chip structure manufactured according to a wafer-scale chip design generated using the design methods and systems described above.

Figure 2:
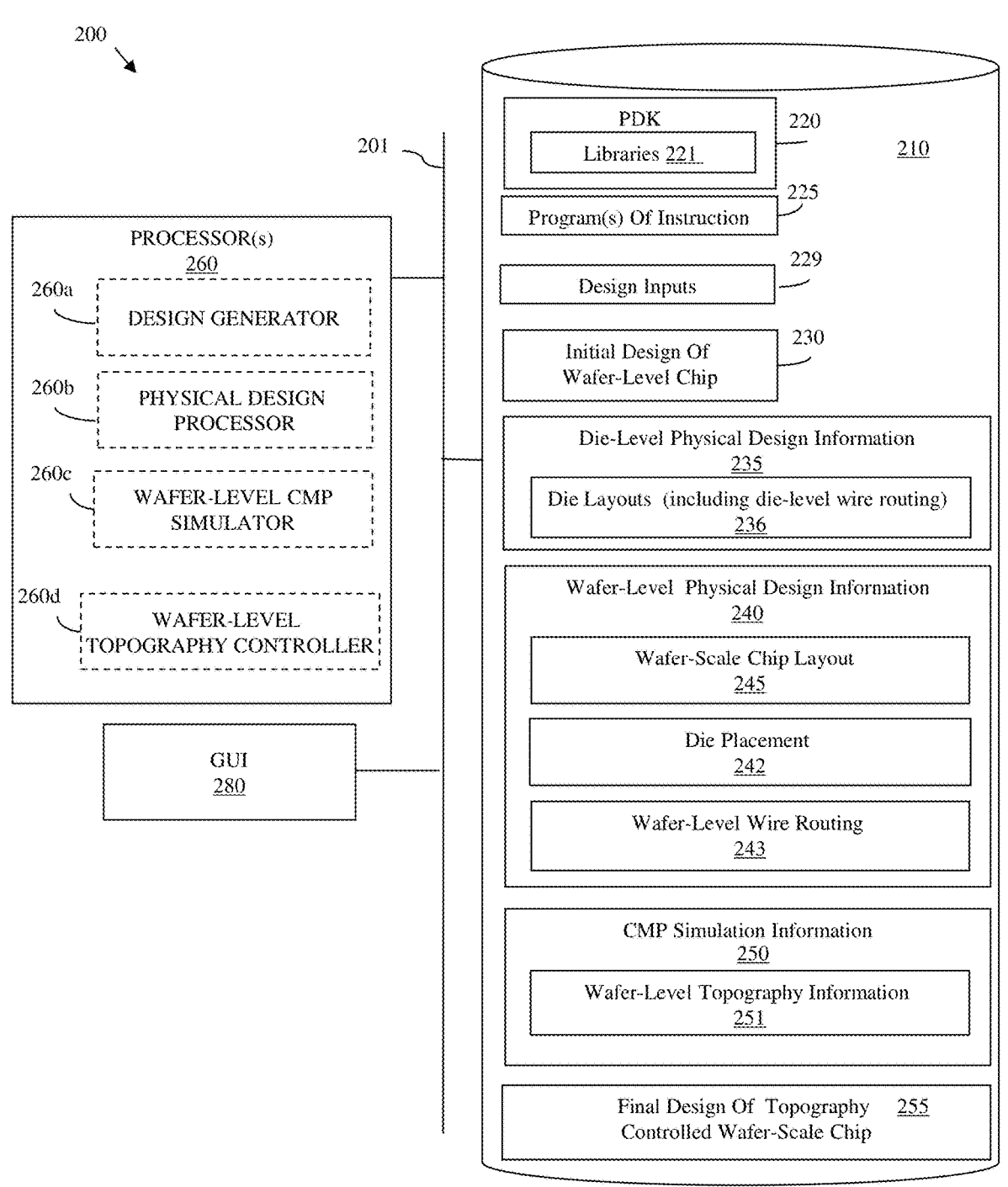
FIG. 2 is a schematic diagram illustrating embodiments of a disclosed system.

More particularly, disclosed herein are embodiments of a method for wafer-scale chip design that provides for post-chip layout wafer-level topography control (also referred to herein as wafer level topography optimization or wafer-scale chip topography control or optimization) and embodiments of a design system for implementing the method (see the flow diagram of FIG. 1 and the system diagram of FIG. 2).

Referring to the FIG. 2, the design system 200 can be a computer-aided design (CAD) system and, specifically, can incorporate at least one memory 210 (e.g., at least one computer readable storage medium, such as a computer readable storage device), a user interface 280 (e.g., a graphic user interface (GUI)) and at least one processor 260. Components of the design system 200, including the processor(s), memory(ies) and GUI, can be interconnected over a system bus 201, as illustrated. Alternatively, any one or more of the components of the design system 200 can communicate with any other component over a wired or wireless network. The memory 210 can store program(s) 225 of instruction (e.g., electronic design automation (EDA) tool(s)) for performing the various design processes described in detail below. The memory 210 can further store, for example, a design kit (PDK) 220. This PDK 220 can include a set of foundry-specific files including, but not limited to, technology files for a specific technology node, various libraries 221 (e.g., a circuit library, a die library, a patterns of fill shapes library, etc.), design rules, etc. PDKs are known in the art and, thus, the details thereof have been omitted from this specification to allow the reader to focus on the disclosed embodiments.

As mentioned above, the design system 200 can incorporate at least one processor 260. Specifically, the design system 200 can incorporate a single specialized processor 260 (e.g., a single specialized computer processing unit) that, during wafer-scale chip design, performs (i.e., that is adapted to perform, that is configured to perform and/or that executes program(s) 225 of instructions to perform) multiple process steps, as described in detail below with regard to the method. Alternatively, the design system 200 can incorporate two or more specialized processors (e.g., see processors 260a, 260b, 260c, and/or 260d, etc.) and, during wafer-scale chip design, each processor can perform (i.e., can be adapted to perform, can be configured to perform and/or can execute one or more specific programs 225 of instructions to perform) one or more of the multiple process steps, as described in detail below with regard to the method. For purposes of illustration, four different special purpose processors are shown in FIG. 2 including a design generator 260a, a physical design processor 260b, a wafer-level chemical mechanical planarization (CMP) simulator 260c, and a wafer-level topography controller 260d (also referred to herein as a wafer-level topography optimizer). It should be understood that FIG. 2 is not intended to be limiting and, additional special purpose processors could be incorporated into the design system 200 and/or the multiple process steps, as described in detail below, could be performed by any number of one or more processors.

In any case, referring to the flow diagram of FIG. 1 in combination with FIG. 2, the disclosed design method of FIG. 1 can, for example, be implemented using the design system 200. In the method, design inputs 229 and, particularly, design and performance specifications for the wafer-scale chip can be received by the design system 200 (e.g., from a designer via a graphic user interface (GUI) 280. The design inputs 229 can be stored in memory 210 (e.g., on a data storage device accessible by the processor(s)).

An initial design 230 for a wafer-scale chip can be developed (see process 102). The initial design 230 can be developed based on the design inputs 229 using the design system 200 and, more specifically, can be developed automatically (e.g., based on automatic operations performed by processor 260 or, if applicable, a design generator 260a executing a program of instructions), can be developed based on designer selections and/or inputs (e.g., through the GUI 280), or can be developed based on a combination of automatic operations and designer selections and/or inputs. The initial design 230 can include multiple dies, where two or more of the dies have different designs. For example, the initial design 230 can include one or more first dies (Die 1) with a first design, one or more second dies (Die 2) with a second design, and so on. The first dies, second dies, etc. can be configured with different processor circuits, memory circuits, etc. Development of the initial design 230 at process 102 can include, but is not limited to, custom design of the dies to be incorporated into the wafer-scale chip and/or selection of the dies to be incorporated into the wafer-scale chip from a die library (i.e., one of the libraries 221). The initial design 230 can further be stored in the memory 210.

Following development of the initial design 230 for the wafer-scale chip at process 102, die-level physical design processes can be performed (see process 103). That is, if layouts for dies that are to be incorporated into the wafer-scale chip have not been generated, then die-level physical design processes can be performed. The die-level physical design processes can be performed using the design system 200 and, more particularly, can be performed automatically (e.g., based on automatic operations performed by processor 260 or, if applicable, a physical design processor 260b executing a program of instructions), can be performed based on designer selections and/or inputs (e.g., through the GUI 280), or can be performed based on a combination of automatic operations and designer selections and/or inputs. The die-level physical design processes can include, but are not limited to, the following for each die design: die-level library element selection and placement, die-level wire routing, and die layout generation. The die-level physical design information 235 (including layouts 236 for each of the die designs) can be stored in memory 210.

Techniques for performing die-level physical design processes are well known in the art and, thus, the details thereof have been omitted from this specification to allow the reader to focus on the salient aspects of the disclosed embodiments. However, it should be noted that, oftentimes die-level physical design processing for a given die design includes die-level topography control (also referred to herein as die-level topography optimization), during which a die-level chemical mechanical planarization (CMP) simulation process is performed based on a layout to determine the across-die surface topography associated a given die design and, more particularly, to map across-die thickness variations. Then, pattern(s) of fill shapes (also referred to herein as dummy fill shapes) are inserted into the layout to adjust the die topography and, more particularly, to achieve an essentially uniform across-die thickness to minimize performance variations. Thus, with die-level topography control, dies with the same specific design and manufactured on the same semiconductor wafer will typically have the same pattern(s) of fill shapes inserted therein. However, dies having the same design (including the same fill shape patterns) but placed at different locations on a semiconductor wafer may still have different thicknesses (e.g., due to CMP variations associated with placement near different dies and/or different BEOL die-to-die interconnect patterns) and, thus, may exhibit performance variations. Therefore, in the disclosed embodiments, topography control is not performed at the die level, but instead performed at the wafer level. Thus, at this point in the method, the layouts for each die design are devoid of BEOL fill shape patterns and may have a non-uniform surface topography.

Following die-level physical design processes (excluding die-level topography control as mentioned above), wafer-level physical design processes can be performed (see process 104). The wafer-level physical design processes can, for example, be performed using the design system 200 and, more particularly, can be performed automatically (e.g., based on automatic operations performed by processor 260 or, if applicable, a physical design processor 260b executing a program of instructions), can be performed based on designer selections and/or inputs (e.g., through the GUI 280), or can be performed based on a combination of automatic operations and designer selections and/or inputs. In any case, at process 104, the wafer-level physical design processes can include, but are not limited to, placement of dies for the wafer-scale chip, wafer-level wire routing for the wafer-scale chip, and wafer-scale chip layout generation.

Figure 3A:
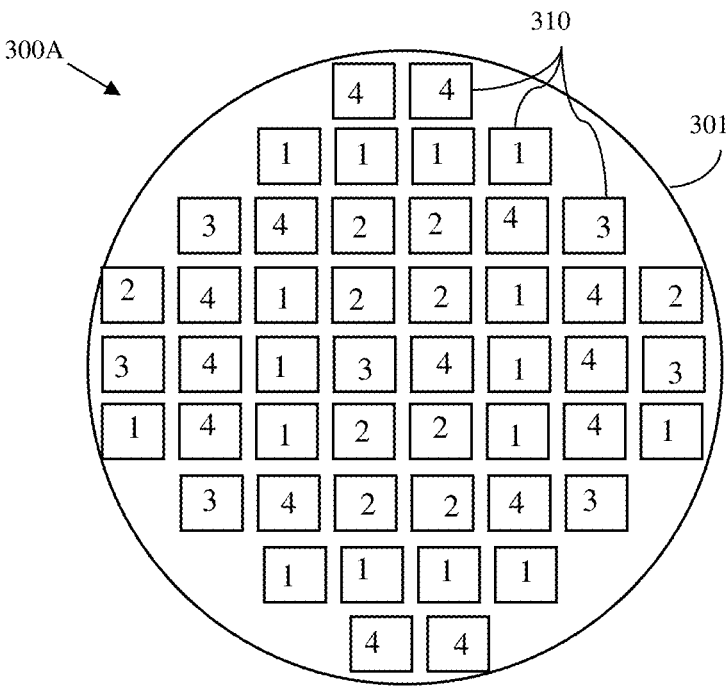
FIG. 3A is a diagram illustrative of a die placement map for a wafer-scale chip.

More specifically, die placement at process 104 can include determining placement of the custom designed and/or selected dies from process 102 on a semiconductor wafer that will form the base of the wafer-scale chip under design. That is, die placement can include determining the specific locations where each die (i.e., each instance of a first die with the first design, each instance of a second die with the second design, and so on) will be formed on the semiconductor wafer of the wafer-scale chip. During die placement, dies with the same design can be grouped together at adjacent locations on the semiconductor wafer or dispersed to various locations through the semiconductor wafer. In any case, at process 104, the dies (e.g., first dies, second dies, third dies, etc.) can be placed at specific locations and across-wafer die placement information 242 (which indicates the locations of first dies having a same first design, the locations of second dies having a same second design, the locations of third dies having a same third design, and so on) can be generated and stored in memory 210. This across-wafer die placement information 242 can, for example, be generated in the form of a map. For example, as illustrated in FIG. 3A, a map 300A generated at process 104 can illustrate a semiconductor wafer 301, can illustrate placement of various dies 310 on the semiconductor wafer 301, and can further indicate the specific design of each die (see the first dies with the first design labeled with a 1, the second dies with the second design labeled with a 2, the third dies with the third design labeled with a 3, and so on). Alternatively, any other type of indicator (e.g., alpha-numeric, color, etc.) could be used within the map 300A to identify or label different dies by specific design. Furthermore, it should be understood that the map 300A is provided for illustration only and that the across-wafer die placement information 242 can be stored in any other suitable format. For example, the semiconductor wafer can be subdivided into a grid with each cell on the grid having a unique address (i.e., a grid coordinate) and a report can indicate the addresses for each of the dies. Furthermore, the total number of dies per wafer-scale chip can vary, the sizes of dies having different designs in any given wafer-scale chip can vary (e.g., first dies could consume a larger amount of chip area than the second dies, etc.), the numbers of different die designs used in a single wafer-scale chip can vary, etc.

Figure 3B:
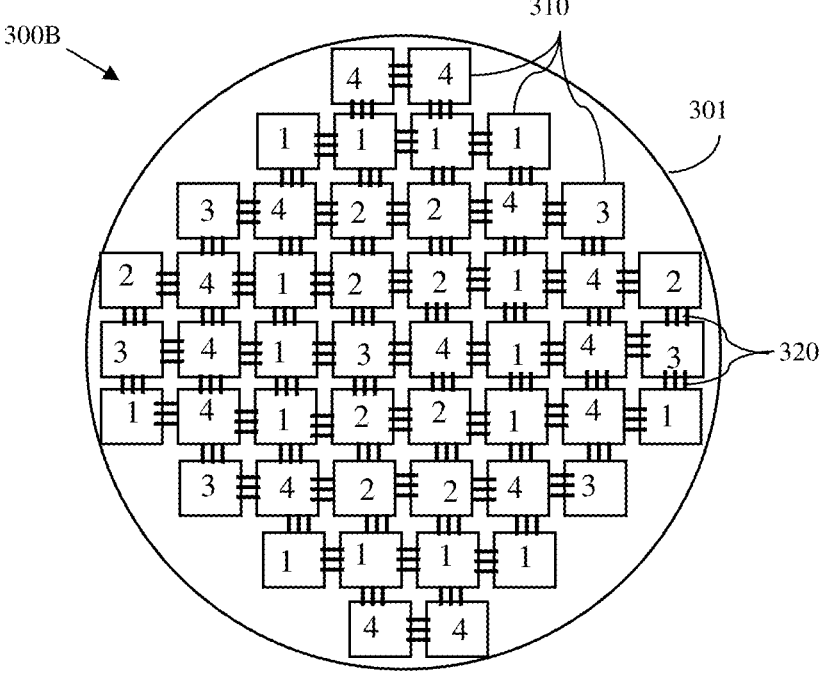
FIG. 3B is a diagram illustrative of the die placement map of FIG. 3A overlayed with wafer-level wire routing information.

Wafer-level wire routing at process 104 can include determining the pattern of interconnects, including the BEOL wires and vias, that will be formed in and/or extend across scribe lines to electrically connect the various dies of the wafer-scale chip given the placement on those dies on the semiconductor wafer (e.g., as shown in FIG. 3A). The wafer-level wire routing information 243 can be stored in memory 210. For example, see the map 300B of FIG. 3B illustrating the wafer-level wire routing information 243 and, particularly, illustrating placement of the dies 310 on the semiconductor wafer 301 (e.g., as shown in FIG. 3A) and further illustrating the interconnects 320 between the dies 310. It should be understood that the map 300B is provided for illustration only and that the wafer-level wire routing information 243 can be stored in any other suitable format. For example, the semiconductor wafer can be divided up into a grid with each cell on the grid having a unique address (i.e., a grid coordinate) for a specific die and a report described or otherwise indicate the electrical connections between dies with adjacent addresses.

Wafer-scale chip layout generation at process 104 can include generating a layout 245 for the wafer-scale chip under design and storing the wafer-scale chip layout 245 in memory 210. The wafer-scale chip layout 245 can be generated based on the layouts 236 for the die designs, on the die placement information 242, on the wafer-level wire routing information 243, and other physical design process information generated at process 104. The wafer-scale chip layout 245 can be stored in memory 210. Thus, following the wafer-level physical design processes, the wafer-level physical design information 240 that is stored in memory 210 can include, but is not limited to, the wafer-scale chip layout 245, the die placement information 242, and the wafer-level wire routing information 243.

Wafer-level topography control can subsequently be performed based on the wafer-level physical design information 240 for the wafer-scale chip (see process 106). Wafer-level topography control can be performed, for example, using the design system 200 and, more particularly, can be performed automatically (e.g., based on automatic operations performed by processor 260 or two or more specialized processors, such as the wafer-level CMP simulator 260c and the wafer-level topography controller 260d, executing program(s) of instructions), can be performed based on designer selections and/or inputs (e.g., through the GUI 280), or can be performed based on a combination of automatic operations and designer selections and/or inputs. Specifically, during wafer-level topography control at process 106, a wafer-level CMP simulation can be performed based on the wafer-level physical design information 240 for the wafer-scale chip including, but not limited to, the wafer-scale chip layout 245 (including the die-specific layouts 236 with die-level wire routing), the die placement information 242, and the wafer-level wire routing information 243 (see process 110). That is, at process 106, die-level and wafer-level models can be integrated to predict CMP-caused across-wafer thickness variations.

Figure 4:
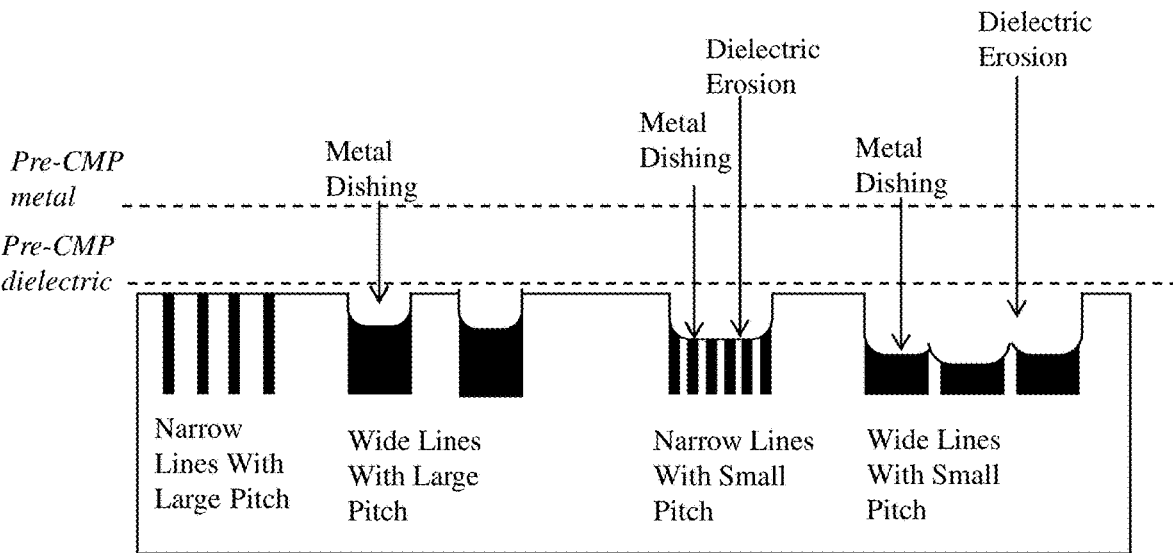
FIG. 4 is cross-section diagram illustrating dishing and erosion caused by chemical mechanical planarization (CMP)
Figure 5:
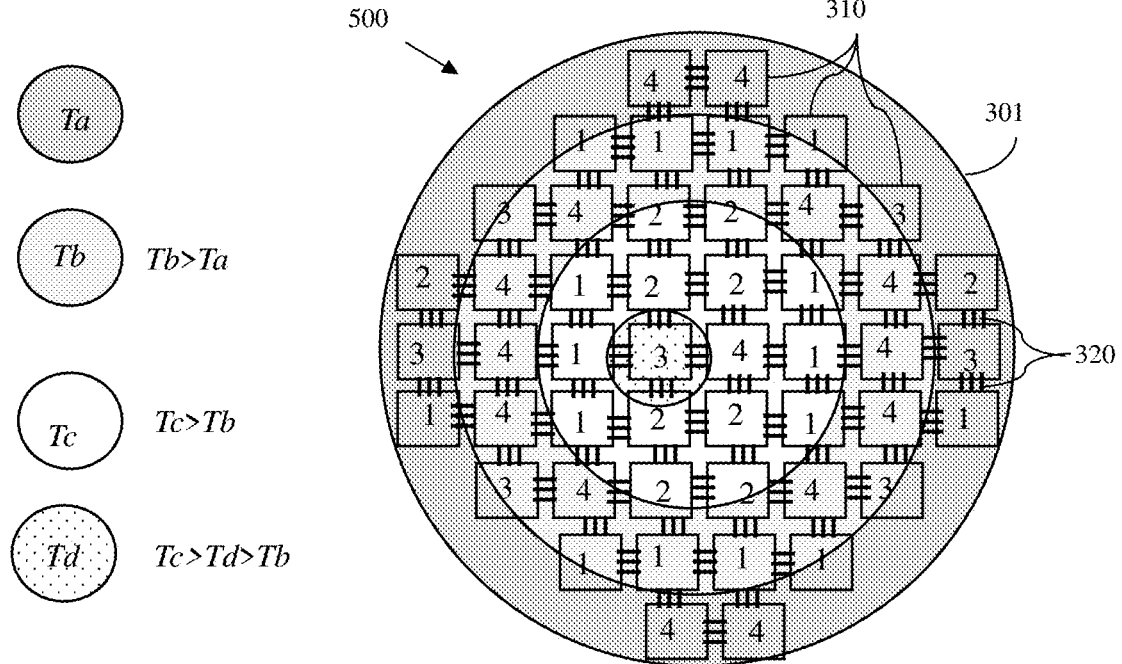
FIG. 5 is a diagram illustrative of wafer-level topography map for a wafer-scale chip.

Specifically, the wafer-level CMP simulation can predict dishing of BEOL metallic features (e.g., wires and vias) and erosion of BEOL dielectrics within local BEOL components of each die on the semiconductor wafer as well as within local BEOL components in the scribe lines between the dies. FIG. 4 is a cross-section diagram illustrating the relationship between feature size and density to CMP-caused dishing and erosion and the effects thereof on surface topography and, thereby thickness. As illustrated CMP-caused dishing and erosion are minimal when the metallic features are relatively narrow and pitch is relatively large so that device thickness is only minimally reduced, whereas CMP-caused dishing and erosion can be significant when the metallic features are relatively wide, and pitch is relatively small so that device thickness is significantly reduced. Thus, wafer-level CMP simulations predict the surface topography of the semiconductor wafer and, more particularly, to predict thickness variations across the semiconductor wafer given the layouts of on-die BEOL components and off-die BEOL components. CMP simulation information 250 including wafer-level topography information 251 can be stored in memory 210. For example, see the map 500 of FIG. 5 illustrating the wafer-level topography information 251 and, particularly, illustrating different average wafer thicknesses (e.g., Ta, Tb, Tc, and Td) across the semiconductor wafer 301. It should be understood that FIG. 5 is provided for illustration purposes and is not intended to be limiting. The different thicknesses and locations thereof will vary depending upon the BEOL components on each die and further between the dies. It should be noted that FIG. 5 further includes the die placement information 242 and the wafer-level wire routing information 243 and, thus, indicates the pre-topography control of thicknesses of each die.

Wafer-level topography control at process 106 can further include inserting different patterns of fill shapes (also referred to as dummy fill shapes) into the layouts for the dies to adjust the wafer topography. Insertion of the fill patterns can specifically be performed to minimize across-wafer thickness variations associated with those specific locations on the semiconductor wafer where specific dies having a same specific design have been placed. That is, insertion of the fill patterns can further be performed with the goal that all dies having the same design will have essentially the same target thickness (i.e., all first dies with the first design have the same first thickness regardless of location, all second dies with the second design have the second thickness regardless of location, and so on). Insertion of the fill patterns can further be performed with the goal that all dies have the same target thickness (i.e., the first thickness of the first dies, the second thickness of the second dies, the third thickness of the third dies, etc. are all essentially equal). Alternatively, insertion of the fill patterns can further be performed with the goal that the target thicknesses are selected, for example, to achieve some optimal or desired performance parameter (e.g., the first thickness can be selected for desired performance of the first dies with the first design, the second thickness can be selected for desired performance of the second dies with the second design, and so on). Thus, across the semiconductor wafer, different dies with different designs may have different thicknesses.

More particularly, wafer-level topography control at process 106 can include reviewing the across-wafer die placement information 242 and the across-wafer topography information 251 previously stored in memory 210 to identify first dies having the same first design and first layout (e.g., labeled 1) and the thicknesses of those first dies (see process 112). Although not specifically shown in the figures, since die-level topography control was not performed, there will likely be some across-die thickness variations. Then, for at least one of the first dies, a pattern of fill shapes can be either selected from a library of patterns of fill shapes (see libraries 221) or custom designed and then inserted into the first layout for the first die (i.e., to generate a modified first layout for that first die) (see process 114). Optionally, the same or different patterns of fill shapes can be selected from the library or custom designed and inserted into the first layouts of other first dies (i.e., to generate modified first layouts for those other first dies, respectively). It should be understood that selection or custom design of the patterns of fill shapes to be inserted into the first layouts of the first dies, respectively, will be based on the across-die variations and further on the location-dependent thicknesses of those first dies and will be performed with the goal that, when manufactured, all first dies (i.e., all dies labeled as 1), will have the same target first thickness (i.e., an essentially uniform across-die first thickness).

For purposes of this disclosure, a pattern of fill shapes (also referred to herein as a pattern of dummy fill shapes) refers to a pattern of non-functional fill shapes in the BEOL metal levels. Typically, these fill shapes will be metallic fill shapes in a dielectric layer, where the dielectric layer includes one or more layers of dielectric material (e.g., a thin layer of etch stop material and a thick layer of interlayer dielectric material). For example, trenches or openings can be formed (e.g., lithographically patterned and etched) in the dielectric layer to have the desired shape and pattern. The trenches/openings can then be filled with one or more layers of metal or metal alloy materials. These metal or metal alloy materials can include, for example, a metallic barrier and/or adhesive liner and a metallic fill material on the liner. In some embodiments, the metal or metal alloy materials can include an adhesion layer (e.g., titanium, titanium nitride, tantalum, or any other suitable adhesion layer), a diffusion barrier layer (e.g., a Noble Metal layer or some other suitable diffusion barrier material layer), and a copper fill material. The fill shapes can further be covered by dielectric material and electrically isolated from other BEOL components (e.g., wires and/or vias) so that they are non-functional (i.e., dummy) features that do not provide electrical connections between on-die components or die-to-die electrical connections. Alternatively, the fill shapes could include any other suitable metal or metal alloy materials in a dielectric layer (e.g., essentially the same metal or metal alloy materials used in BEOL metal wiring used for on-die and die-to-die electrical connections). Alternatively, the fill shapes a pattern of fill shapes could include dielectric fill shapes formed in a metallic layer (e.g., metallic wire or plate) that is electrically isolated from other BEOL components such that it is non-functional.

Additionally, in the disclosed embodiments, different patterns of fill shapes can have one or more differences such as different overall pattern sizes, different fill shape sizes, different fill shapes, different fill shape materials, different fill shape densities, different fill shape pitches, and/or different numbers of pattern layers (e.g., in the case of stacked fill shapes). FIGS. 6.1-6.11 are illustrative of different fill shape patterns that could be custom designed or selectable from a library of patterns of fill shapes. Some of these patterns include differently shaped fill shapes (e.g., rectangular fill shapes, square fill shapes, cross-shaped fill shapes, etc.). Some of these patterns include fill shapes of different sizes. Some of these patterns include different pitches. Some of these patterns include different numbers of fill shapes. These fill shape patterns shown in FIGS. 6.1-6.11 are provided for illustration purposes and not intended to be limiting. The design systems and methods could employ any other suitable fill shape patterns.

Figures 7A, 7B:
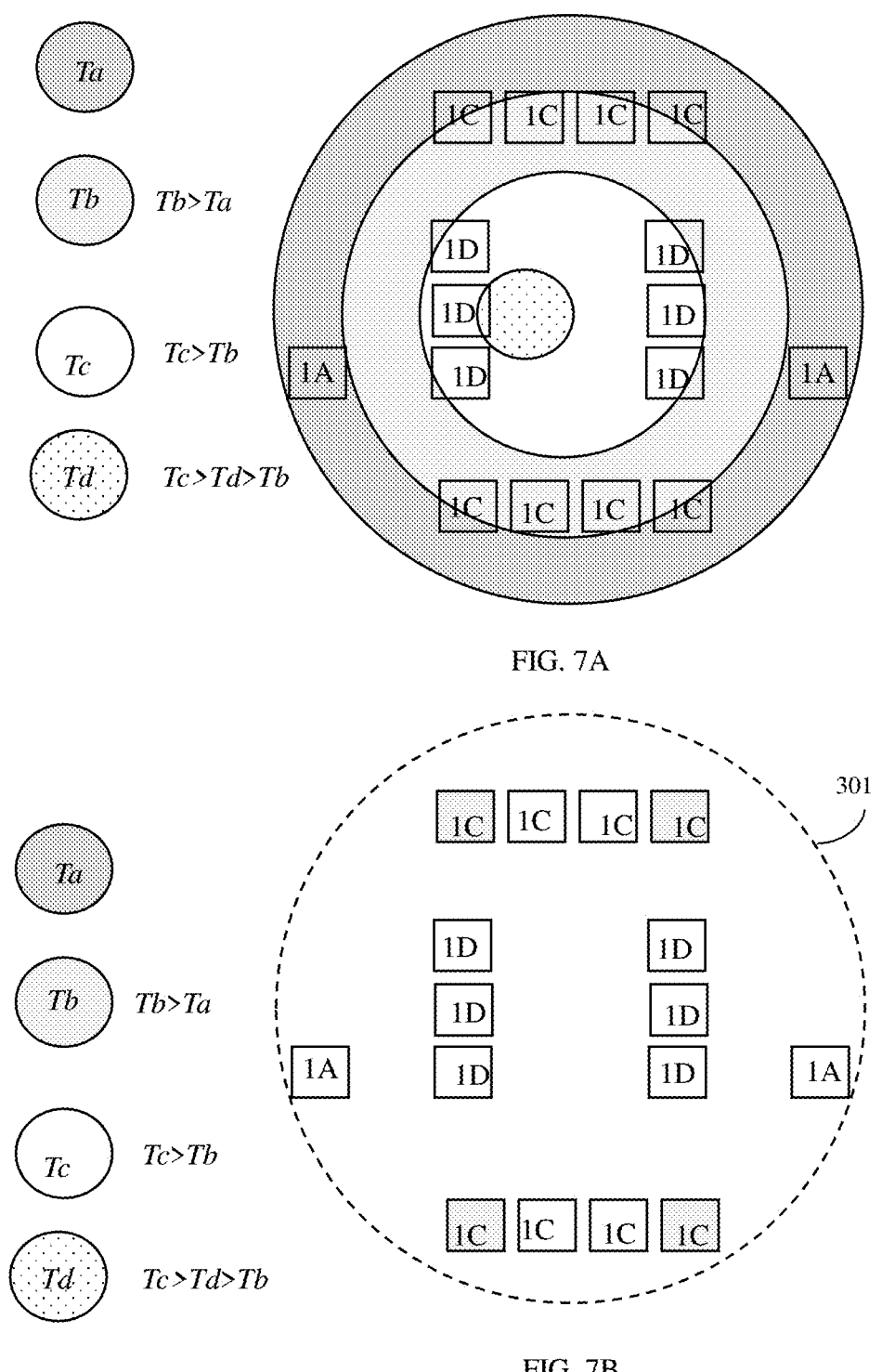
FIG. 7A-7D are diagrams illustrative of partially completed wafer-level topography maps during a first iteration of topography control.
Figures 7C, 7D:
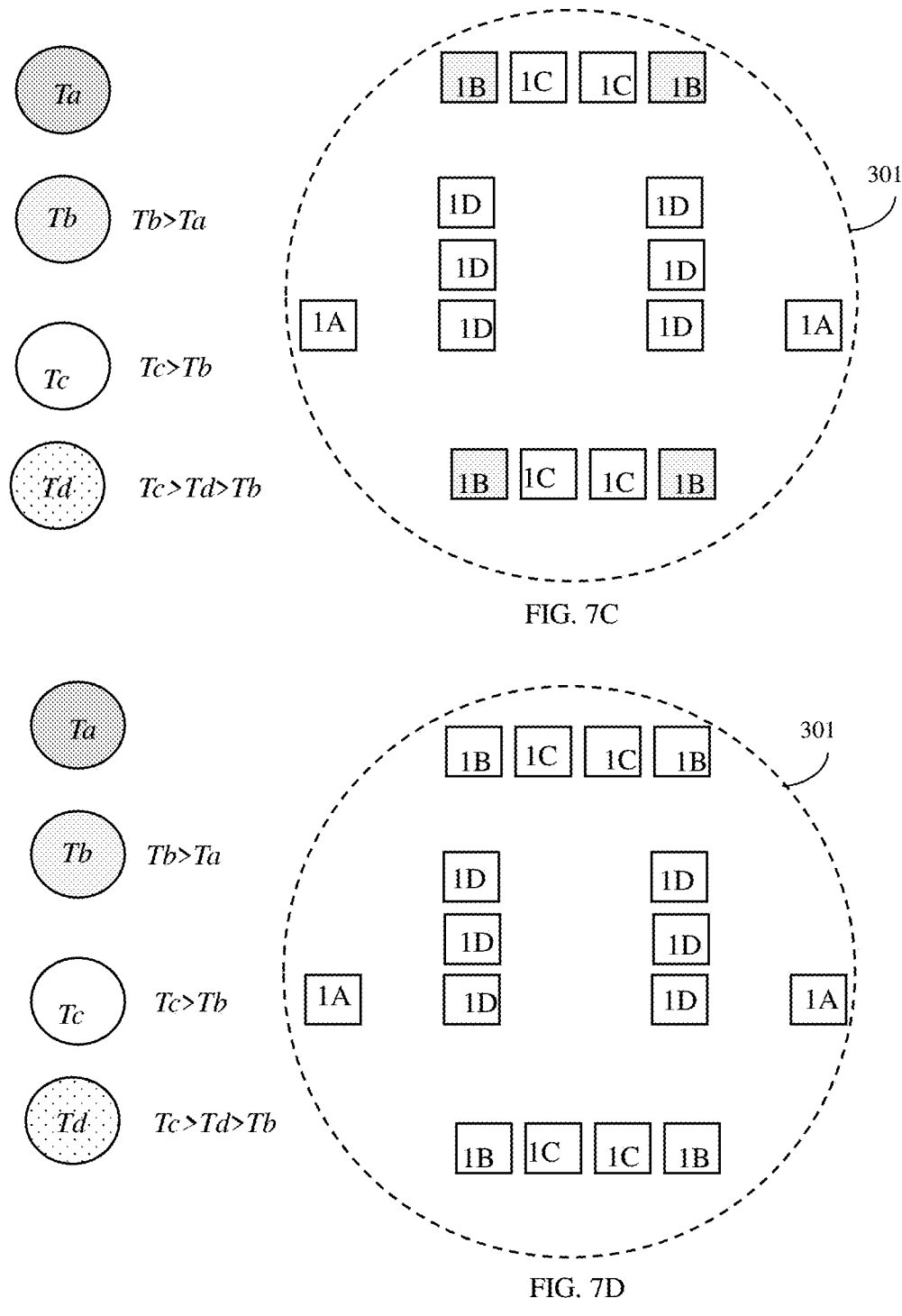

Since topography control is performed at the wafer-level and not at the die-level and since different first dies at different locations on the semiconductor wafer may have different thicknesses before the performance of wafer-level topography control, when any two first dies at different locations on the semiconductor wafer have different thicknesses, then different patterns of fill shapes will be custom designed or selected for insertion into the first layouts of those two first dies, respectively, so that, when the wafer-scale chip is manufactured, those two first dies will have the same essentially uniform first thickness. FIG. 7A is illustrative of three different patterns of fill shapes (A, C and D) custom designed or selected at process 114 for insertion into the first layouts for the first dies on the semiconductor wafer (now labeled 1A, 1C, and 1D) in an attempt to achieve the same essentially uniform first thickness of, for example, Tc across each of the first dies. Following process 114, verification can be performed (see processes 116 and 118). That is, the wafer-level CMP simulation can be repeated to generate, and store updated across-wafer topography information (see process 116). This updated across-wafer topography information can subsequently be reviewed to determine whether the first dies all have the same essentially uniform first thickness (see process 118). If not, these processes (i.e., the customizing or selecting of the patterns of fill shapes for the first dies, the repeating of the wafer-level CMP simulation, and the reviewing of the updated across-wafer topography information) can be iteratively repeated until all first dies are found to have the same essentially uniform first thickness. FIG. 7B illustrates that the results of the repeated wafer-level CMP simulation may show that the patterns of fills shapes custom designed or selected for insertion into the first layouts of the first dies (as shown in FIG. 7A) may result in some first dies being thinner than desired and, particularly, having a thickness of Tb as opposed to Tc. FIGS. 7C and 7D illustrate that the pattern C previously placed into the first layouts of the thinner first dies can be replaced with a pattern B to increase the thickness of those dies to Tc.

Once it is determined that the first dies will have the same essentially uniform first thickness, these same processes can be iteratively repeated for the second dies. Specifically, the across-wafer die placement information 242 and the updated across-wafer topography information 251 can be reviewed to identify second dies having the same second design and second layout (e.g., labeled 2) and the thicknesses of those second dies (see process 120). Then, for at least one of the second dies, a pattern of fill shapes can be selected from a library of patterns of fill shapes (see libraries 221) or custom designed and then inserted into the second layout for that second die (i.e., to generate a modified second layout for that second die) (see process 122). Optionally, the same or different patterns of fill shapes can be either selected from the library or custom designed and inserted into the second layouts of other second dies (i.e., to generate modified second layouts for those other second dies, respectively). It should be understood that selection or custom design of the patterns of fill shapes to be inserted into the second layouts of the second dies, respectively, will be based on the across-die variations and further on the location-dependent thicknesses of those second dies and will be performed with the goal that, when manufactured, all second dies (i.e., all dies labeled as 2), will have the same target second thickness (i.e., the same essentially uniform across-die second thickness).

Following process 122, verification can be performed (see processes 124-126). That is, the wafer-level CMP simulation can be repeated to generate, and store updated across-wafer topography information (see process 124). This updated across-wafer topography information can subsequently be reviewed to determine whether the second dies will all have the same essentially uniform second thickness (see process 126). If not, these processes (i.e., the customizing or selecting of the patterns of fill shapes for the second dies, the repeating of the wafer-level CMP simulation, and the reviewing of the updated across-wafer topography information) can be iteratively repeated until it is determined that all second dies will have the same essentially uniform second thickness.

Figures 8A, 8B:
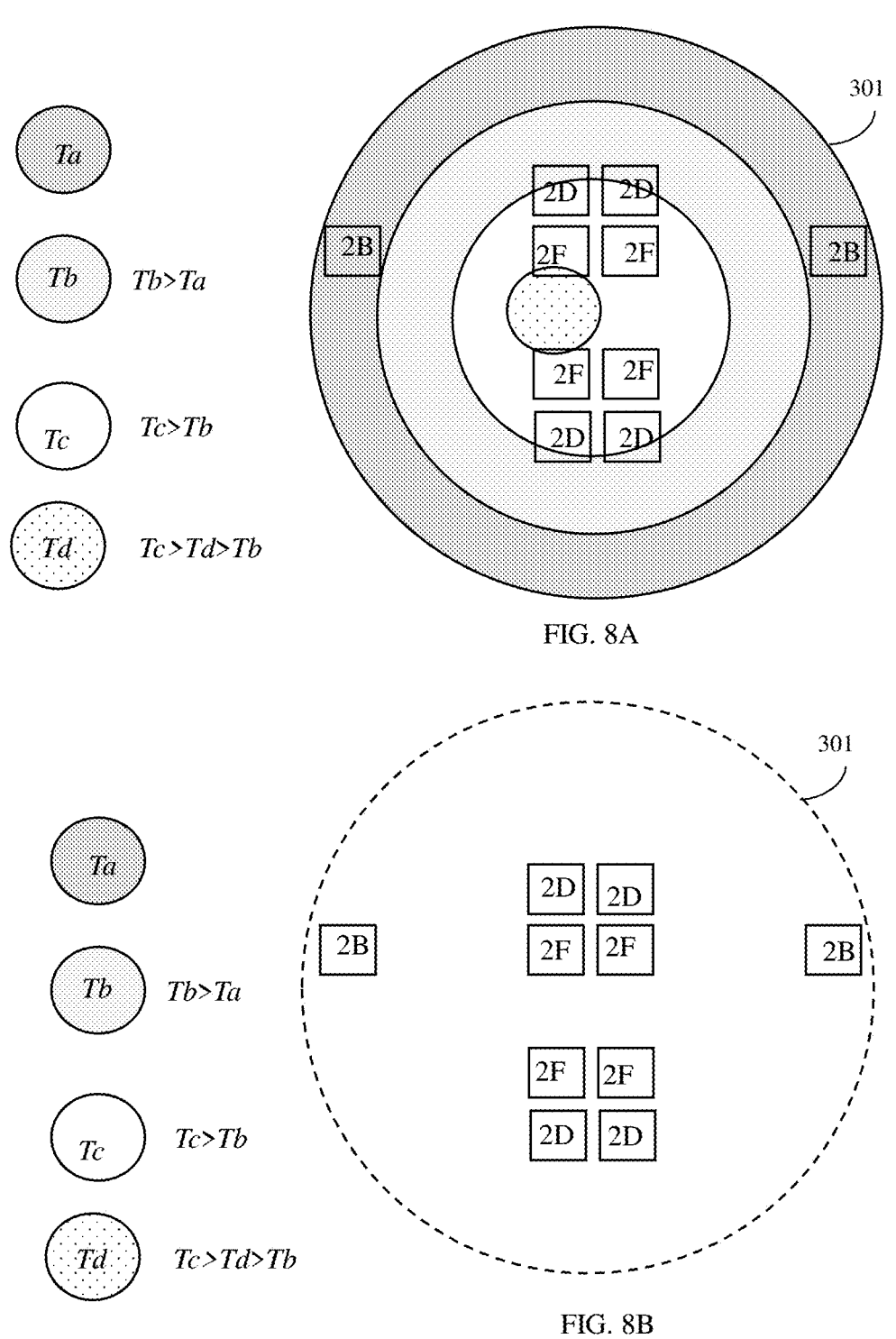
FIG. 8A-8B are diagrams illustrative of partially completed wafer-level topography maps during a second iteration of topography control where first and second dies are to have the same thickness.

It should be noted that the target second thickness of second dies with the second design can be the same as the target first thickness of first dies with the first design. FIGS. 8A-8B are illustrative of three different patterns of fill shapes (B, D and F) being custom designed or selected at process 122 for insertion into the second layouts for the second dies on the semiconductor wafer (now labeled 2B, 2D, and 2F) and the results of the repeated wafer-level CMP simulation that shows all second dies having the same second thickness of Tc (which is essentially equal to the first thickness of the first dies), respectively.

Figure 9A:
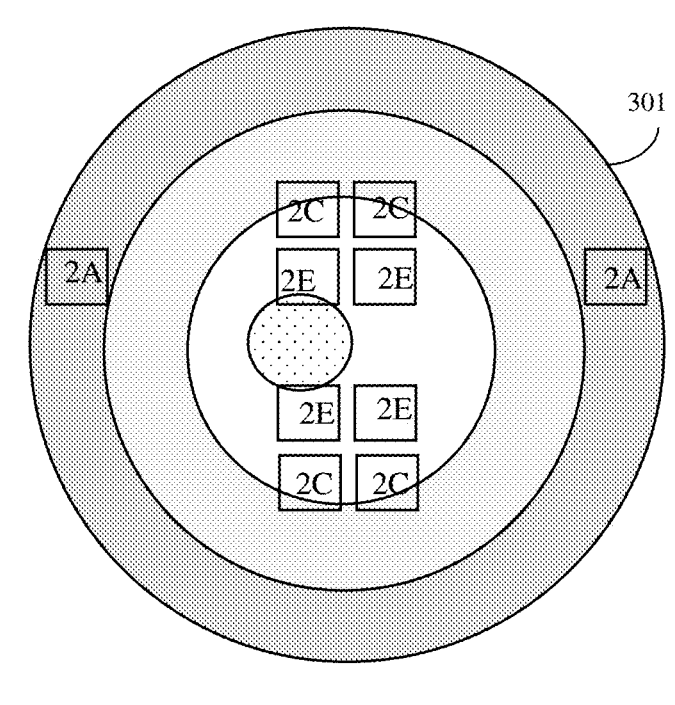
FIGS. 9A-9B are diagrams illustrative of partially completed wafer-level topography maps during a second iteration of topography control where first and second dies are to have different thicknesses.
Figure 9B:
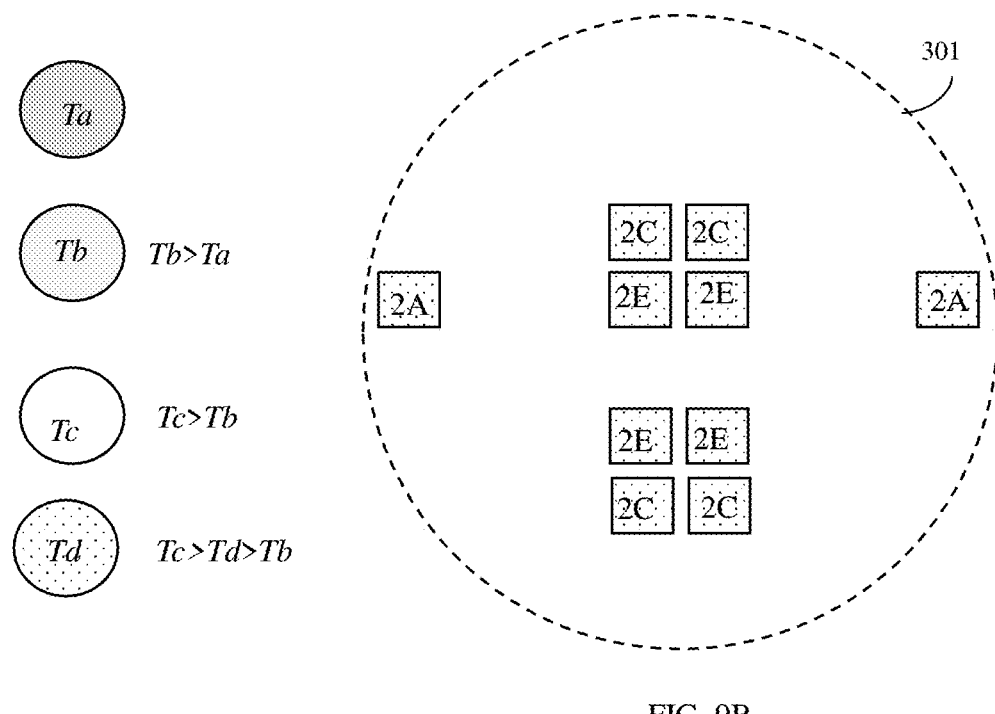

Alternatively, the target second thickness of second dies with the second design can be different from the target first thickness of first dies with the first design. For example, performance of the first and second dies may be topography dependent. Thus, the target first and second thicknesses can be predetermined, for example, to achieve some desired or optimal performance in the first and second dies, respectively. FIGS. 9A-9B are illustrative of three different patterns of fill shapes (A, C and E) being custom designed or selected at process 122 for insertion into the second layouts for the second dies on the semiconductor wafer (now labeled 2B, 2D, and 2F) and the results of the repeated wafer-level CMP simulation that shows all second dies having the same target second thickness of Td (which is thinner than the target first thickness of the first dies), respectively.

Once it is determined that the second dies have the same essentially uniform second thickness (which is the same or different from the first thickness of the first dies, as mentioned above), these same processes can be iteratively repeated for the third dies, the fourth dies, and so on. Again, the method can be performed so that all the dies have the same target thickness (i.e., so the target first thickness of the first dies, the target second thickness of the second dies, target third thickness of the third dies, the target fourth thickness of the fourth dies, etc. are essentially equal). Alternatively, if/when performance of any of these dies is topography-dependent, then topography control can be performed to achieve a target thickness predetermined to control performance and different from the target thicknesses of the other devices.

It should be noted that techniques for wafer-level topography control at process 106 described above are provided for illustration purposes and are not intended to be limiting. For example, during wafer-level topography control at process 106, each iteration involves the performance of topography control with respect to a set of dies, where the dies in the set all have the same design and are placed on a semiconductor wafer for incorporation into a wafer-scale chip. That is, the first iteration involves topography control directed to first dies placed on the wafer and having the first design, the second iteration involves topography control directed to second dies placed on the wafer and having the second design, and so on. In one embodiment described above, the target thicknesses used for the different iterations are the same (i.e., the target first thickness of the first dies is the same as the target second thickness of the second dies, and so on). In another embodiment described above, the target thicknesses used for the different iterations can be different to achieve some optimal or desired performance (e.g., the target $1^{st}$ thickness of the first dies can be different from the target second thickness of the second dies). Thus, in any of the embodiments herein, any two dies with the same design could potentially have two completely different fill shape patterns inserted therein.

In other embodiments, additional and/or alternative constraints could be applied to one or more of the iterations during wafer-level topography control at process 106. The additional and/or alternative constraints could be applied to minimize performance variations and/or control performance of one or more on-die operations (e.g., of one or more critical operation(s)). For example, if avoiding performance variations between active devices or blocks within each first die is critical and if performance of the active devices or blocks at issue within each first device is particularly dependent on the adjacent fill shapes, then an additional constraint can be applied during the first iteration. An additional constraint used during first iteration of wafer-level topography control at process 106 could specify that in all first dies the portion of the fill shape pattern inserted in the area of the layout proximal to (e.g., surrounding) the active devices or blocks at issue will be the exact same and the portion of the fill shape pattern distal to the active devices or blocks at issue can be varied in an attempt to achieve the target first thickness. The additional and/or alternative constraints could also be applied to improve manufacturability. For example, in any given iteration of wafer-level topography control at process 106, the selectable patterns of fill shapes could be limited to minimize the masks required during manufacturing.

Following wafer-level topography control at process 106, additional design processes for the wafer-scale chip can be performed (e.g., using the design system 200) to generate a final wafer-scale chip design (including the different patterns of fill shapes inserted into the layouts of the dies at process 106) and to store the final wafer-scale chip design 255 in memory (see process 130).

Subsequently, the final wafer-scale chip design 255 can proceed to tape out and a wafer-scale chip can be manufactured according to the final wafer-scale chip design 255 (see process 140).

Figures 10, 11:
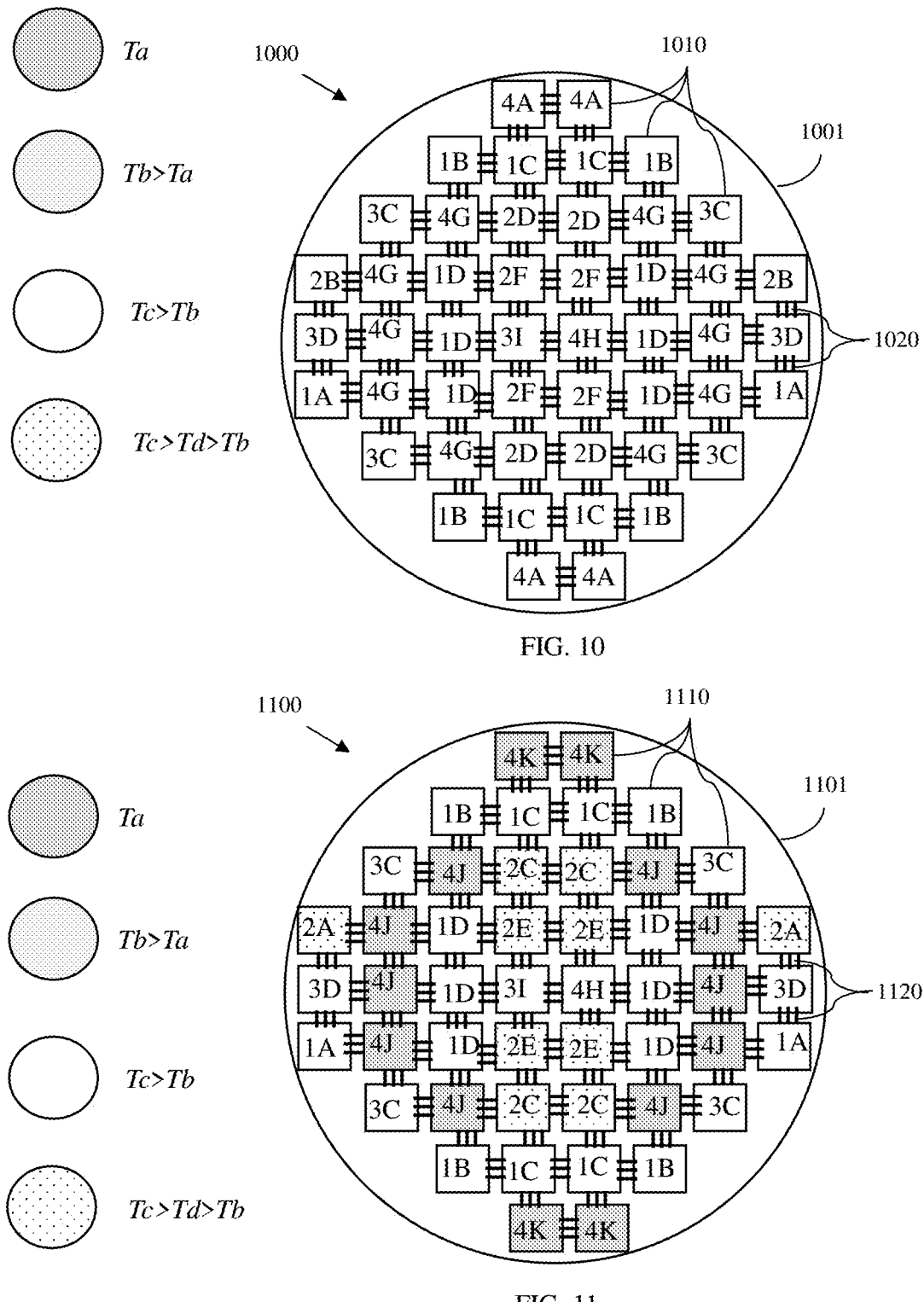
FIG. 10 is layout diagram illustrative of an embodiment of a wafer-scale chip formed using an embodiment of the disclosed method and/or system.
FIG. 11 is a layout diagram illustrative of an alternative embodiment of a wafer-scale chip formed using an alternative embodiment of the disclose method and/or system.

Referring to FIGS. 10 and 11, also disclosed herein are embodiments of a structure and, particularly, a wafer-scale chip 1000, 1100 manufactured according to a wafer-scale chip design generated using the above-described design method of FIG. 1 and/or design system 200 of FIG. 2.

The wafer-scale chip 1000, 1100 can include a semiconductor wafer 1001, 1101. The wafer-scale chip can further include multiple dies 1010, 1110 on the semiconductor wafer 1001, 1101. Some of the dies 1010, 1110 can have the same design and some can have different designs. It should be noted that the figures are not intended to be limiting and that, alternatively, the wafer-scale chip 1000, 1100 can include any number of two or more different dies. Furthermore, while all the dies are shown as being essentially the same size, alternatively, any two or more of the die designs can have different sizes (i.e., can consume different amounts of wafer area). It should further be noted that this wafer-scale chip is not an intermediate structure on a wafer prior to dicing but rather a final chip structure. That is, in addition to the semiconductor wafer 1001, 1101 and the dies 1010, 1110 on the semiconductor wafer 1001, 1101, the wafer-scale chip 1000, 1100 can further include interconnects 1020, 1120 and, particularly, BEOL wires and vias, in and/or extend across scribe lines between the dies 1010, 1110 to electrically connect the various dies.

During design, this wafer-scale chip 1000, 1100 was subjected to wafer-level topography control, as described in detail above regarding the design method and system embodiments. Thus, in this wafer-scale chip 1000, 1100, at least some of the dies 1010, 1110 include different patterns of fill shapes.

As mentioned above, for purposes of this disclosure, a pattern of fill shapes (also referred to herein as a pattern of dummy fill shapes) refers to a pattern of non-functional fill shapes in the BEOL metal levels. Typically, these fill shapes will be metallic fill shapes in a dielectric layer, where the dielectric layer includes one or more layers of dielectric material (e.g., a thin layer of etch stop material and a thick layer of interlayer dielectric material). For example, trenches or openings can be formed (e.g., lithographically patterned and etched) in the dielectric layer to have the desired shape and pattern. The trenches/openings can then be filled with one or more layers of metal or metal alloy materials. These metal or metal alloy materials can include, for example, a metallic barrier and/or adhesive liner and a metallic fill material on the liner. In some embodiments, the metal or metal alloy materials can include an adhesion layer (e.g., titanium, titanium nitride, tantalum, or any other suitable adhesion layer), a diffusion barrier layer (e.g., a Noble Metal layer or some other suitable diffusion barrier material layer), and a copper fill material. The fill shapes can further be covered by dielectric material and electrically isolated from other BEOL components (e.g., wires and/or vias) so that they are non-functional (i.e., dummy) features that do not provide electrical connections between on-die components or die-to-die electrical connections. Alternatively, the fill shapes could include any other suitable metal or metal alloy materials in a dielectric layer (e.g., essentially the same metal or metal alloy materials used in BEOL metal wiring used for on-die and die-to-die electrical connections). Alternatively, the fill shapes a pattern of fill shapes could include dielectric fill shapes formed in a metallic layer (e.g., metallic wire or plate) that is electrically isolated from other BEOL components such that it is non-functional.

Additionally, the different patterns of fill shapes can have one or more differences such as different overall pattern sizes, different fill shape sizes, different fill shapes, different fill shape materials, different fill shape densities, different fill shape pitches, and/or different numbers of pattern layers (e.g., in the case of stacked fill shapes). FIGS. 6.1-6.11 are illustrative of fill shape patterns that could, optionally, be included in the dies of the wafer-scale chip Some of these patterns include differently shaped fill shapes (e.g., rectangular fill shapes, square fill shapes, cross-shaped fill shapes, etc.). Some of these patterns include fill shapes of different sizes. Some of these patterns include different pitches. Some of these patterns include different numbers of fill shapes. It should be understood that the figures are not intended to be limiting and that, alternatively, other fill shape patterns could be used.

For purposes of illustration, each of the dies 1010, 1110 in the wafer-scale chip 1000, 1100 is labeled with an alphanumeric designator or reference identifier. The designator includes a number (e.g., 1, 2, 3, 4, and so on) indicating the design of that die. For example, FIGS. 10 and 11, dies labeled with a 1 are first dies having a first design, dies labeled with a 2 are second dies with a second design, dies labeled with a 3 are third dies with a third design, dies labeled with a 4 are fourth dies with a fourth design, and so on. In some embodiments, the first can be configured for performing a first function, the second dies can be configured for performing a second function, the third dies can be configured for performing a third function, the fourth dies can be configured for performing a fourth function, and so on. The first dies can be different from the second dies, the second dies can be different from the third dies, and so on. The functions can be, for example, different memory functions, different processing functions, etc. The designator includes a letter (e.g., A, B, C, D, E, F, and so on) indicating a particular pattern of fill shapes that have been inserted into that particular chip, where the pattern A is different from the pattern B, the pattern B is different from the pattern C, and so on. These patterns could, for example, corresponding to patterns similar to those shown in FIGS. 6.1-6.11 or some other patterns. Thus, in the wafer-scale chip 1000, 1100, a die that is labeled 1A has the first design and pattern A of fill shapes, a die that is labeled 1B has the first design and pattern B of fill shapes.

Referring specifically to FIG. 10, in the wafer-scale chip 1000, all dies 1010 can have the same essentially uniform thickness (e.g., of Tc). That is, wafer-level topography control (also referred to herein as wafer level topography optimization) can be performed as described above so that the different patterns of fill shapes in the first dies ensure that the first dies all have the same essentially uniform first thickness, so that the different patterns of fill shapes in the second dies ensure that the second dies all have the same essentially uniform second thickness, and so on and further such that the thicknesses of all of these dies is essentially the same and equal to some predetermined thickness (e.g., Tc). Thus, the wafer-scale chip 1000 has an essentially uniform wafer-level surface topography in which all across-wafer thickness variations are minimized.

Referring specifically to FIG. 11, in the wafer-scale chip 1100, dies with the same design can have the same essentially uniform thickness and dies with different designs can, optionally, have different thickness. The different thicknesses of different die designs can be selected during wafer-level topography control processes in order to achieve some optimal or desired performance. That is, wafer-level topography control can be performed as described above so that the different patterns of fill shapes in the first dies ensure that the first dies all have the same essentially uniform first thickness, so that the different patterns of fill shapes in the second dies ensure that the second dies all have the same essentially uniform second thickness, and so on and further such that two or more die designs are associated with different thickness. For example, as illustrated, the first thickness of the first dies and the third thickness of the third dies could be Tc (i.e., relatively thick), the fourth thickness of the fourth dies could be Ta (i.e., relatively thin), and the second thickness of the second dies could be Td (i.e., between Tc and Ta). Thus, the wafer-scale chip 1100 does not have an essentially uniform wafer-level surface topography but dies with the same specific design on the wafer-scale chip 1100 have the same surface topography such that across-wafer thickness variations between dies with the same design are minimized.

The present disclosure may be a system, a method, and/or a computer program product. The computer program product may include a computer readable storage medium (or media) having computer readable program instructions thereon for causing a processor to conduct aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or conduct combinations of special purpose hardware and computer instructions.

Figure 12:
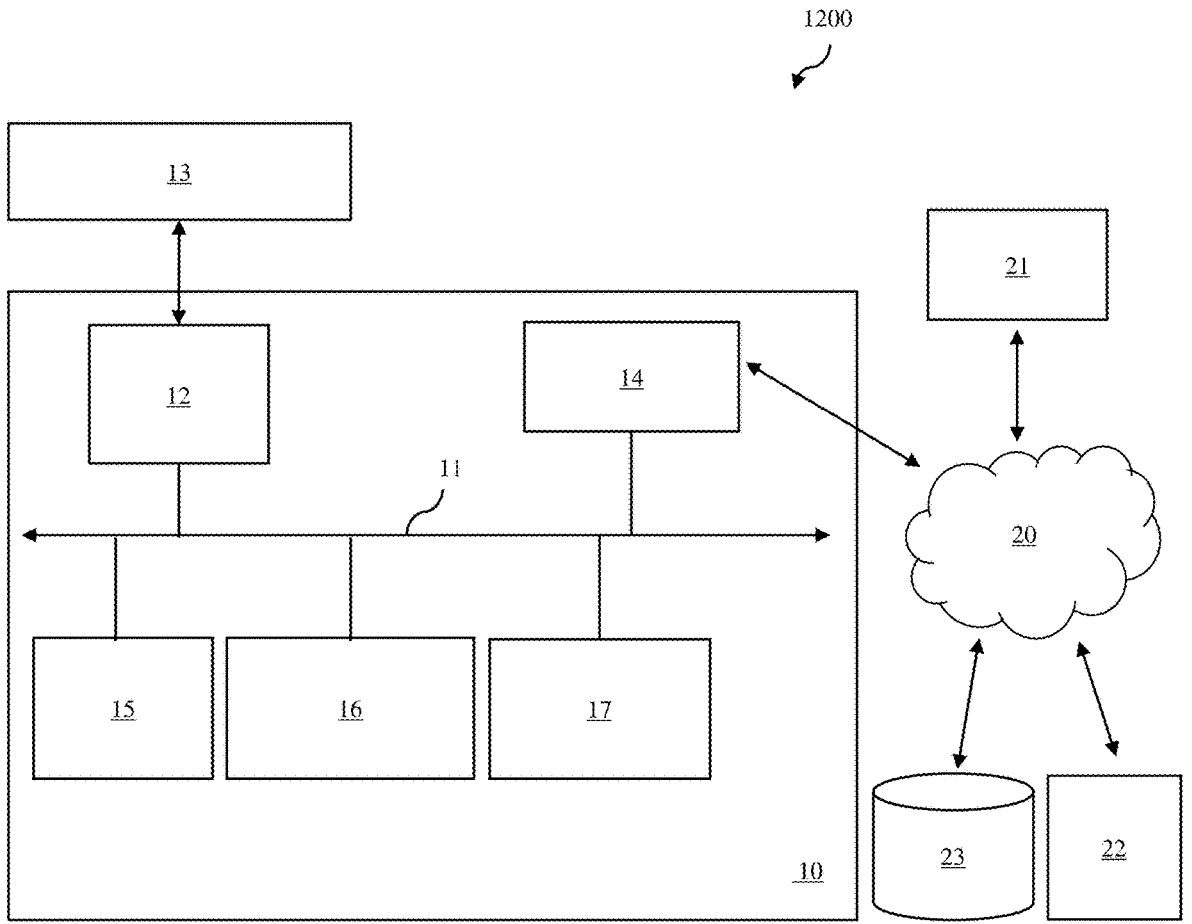
FIG. 12 is a schematic diagram illustrative of a hardware environment for implementing aspects of the disclosed embodiments.

An illustrative hardware environment 1200 for implementing aspects of the disclosed methods, systems, and computer program products is depicted in FIG. 12. Generally, the hardware environment can include at least one computing device 10 (also referred to herein as a computer). The computer 10 can be, for example, a desktop, laptop, tablet, mobile computing device, etc. The computer 10 can include at least one bus 11. The bus 11 can be connected to various other components of the computer 10 and can be configured to facilitate communication between those components.

The computer 10 can include various adapters. The adapters can include one or more peripheral device adapters 12, which are configured to facilitate communications between one or more peripheral devices 13, respectively, and the bus 11. The peripheral devices 13 can include user input devices configured to receive user inputs. User input devices can include, but are not limited to, a keyboard, a mouse, a microphone, a touchpad, a touchscreen, a stylus, biosensor, a scanner, or any other type of user input device. The peripheral devices 13 can also include additional input devices, such as external secondary memory devices (as discussed in greater detail below). The peripheral devices 13 can also include output devices. The output devices can include, but are not limited to, a printer, a monitor, a speaker, or any other type of computer output device. The adapters can include one or more communications adapters 14 (also referred to herein as a computer network adapters), which are configured to facilitate communications between the computer 10 and one or more communications networks 20 (e.g., a wide area network (WAN), a local area network (LAN), the internet, a cellular network, a Wi-Fi network, etc.). Such network(s) 20 can, in turn, facilitate communications between the computer 10 and other system components on the network: remote server(s) 21, other device(s) 22 (e.g., computers, laptops, tablets, mobile phones, etc.), remote data storage 23, etc.

The computer 10 can further include at least one processor 15 (also referred to herein as a central processing units (CPU)). Optionally, each CPU 15 can include a CPU cache. Each CPU 15 can be configured to read and execute program instructions.

The computer 10 can further include memory and, particularly, computer-readable storage mediums. The memory can include primary memory 16 and secondary memory. The primary memory 16 can include, but is not limited to, random access memory (RAM) (e.g., volatile memory employed during execution of program operations) and read only memory (ROM) (e.g., non-volatile memory employed during start-up). The RAM can include, but is not limited to, dynamic random access memory (DRAM), static random access memory (SRAM), or any other suitable type of RAM. The ROM can include, but is not limited to, erasable programmable read only memory (EPROM), flash memory, electronically erasable programmable read only memory (EEPROM), programmable read only memory (PROM), or any other suitable type of ROM. The secondary memory can be non-volatile. The secondary memory can include internal secondary memory 17, such as internal solid state drive(s) (SSD(s)) and/or internal hard disk drive(s) (HDD(s)), installed within the computer 10 and connected to the bus 11. The secondary memory can also include external secondary memory connected to or otherwise in communication with the computer 10 (e.g., peripheral devices). The external secondary memory can include, for example, external/portable SSD(s), external/portable HDD(s), flash drive(s), thumb drives, compact disc(s) (CD(s)), digital video disc(s) (DVD(s)), network-attached storage (NAS), storage area network (SAN), or any other suitable non-transitory computer-readable storage media connected to or otherwise in communication with the computer 10. The different functions of primary and secondary memory are well known in the art and, thus, the details thereof have been omitted from this specification in order to allow the reader to focus on the salient aspects of the disclosed embodiments.

In some embodiments, program instructions for performing the disclosed method or a portion thereof, as described above, can be embodied in (e.g., stored in) secondary memory accessible by the computer 10. When the program instructions are to be executed (e.g., in response to user inputs to the computer 10), required information (e.g., the program instructions and other data) can be loaded into the primary memory (e.g., stored in RAM). The CPU 15 can read the program instructions and other data from the RAM and can execute the program instructions. In other embodiments, a client-server model can be employed. In this case, the computer 10 can be a client and a remote server 21 in communication with the computer 10 over a network 20 can provide, to the client, a service including execution of program instructions for performing the disclosed method or a portion thereof, as described above, in response to user inputs the computer 10.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises", "comprising", "includes", and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a semiconductor wafer; and
multiple dies on the semiconductor wafer, wherein the dies comprise at least two dies with different patterns of fill shapes.

2. The structure of claim 1, wherein the dies comprise first dies with patterns of fill shapes, wherein the first dies with the patterns of fill shapes have a same first thickness and a same first design, and wherein at least some of the patterns of fill shapes in the first dies are different.

3. The structure of claim 2, wherein the dies comprise second dies with patterns of fill shapes, wherein the second dies have a same second design and a same second thickness, and wherein at least some of the patterns of fill shapes in the second dies are different.

4. The structure of claim 3, wherein the first thickness and the second thickness are essentially the same.

5. The structure of claim 3, wherein the first thickness and the second thickness are different.

6. The structure of claim 1, wherein each pattern of fill shapes comprises any of metallic fill shapes within a dielectric layer and dielectric fill shapes within a metallic layer.

7. The structure of claim 1, wherein differences of any two different patterns of fill shapes comprise any of different pattern sizes, different fill shape sizes, different fill shapes, different fill shape densities, different fill shape pitches, and different numbers of pattern layers.

8. The structure of claim 1, wherein the different patterns of the fill shapes minimize one of any across-wafer thickness variations and across-wafer thickness variations between specific dies having a same specific design.

9. The structure of claim 1, wherein the fill shapes are electrically isolated and non-functional.

10. A structure comprising:

a semiconductor wafer; and multiple dies on the semiconductor wafer, wherein the dies comprise at least two dies with different patterns of fill shapes, wherein the dies comprise first dies with patterns of fill shapes, wherein the first dies with the patterns of fill shapes have a same first thickness and a same first design, and wherein at least some of the patterns of fill shapes in the first dies are different, and wherein the dies comprise second dies with patterns of fill shapes, wherein the second dies have a same second design that is different from the first design and a same second thickness, and wherein at least some of the patterns of fill shapes in the second dies are different.

\* \* \* \* \*